United States Patent
Shveidel et al.

(10) Patent No.: US 12,430,049 B2
(45) Date of Patent: Sep. 30, 2025

(54) DATA LOG WITH BONDED DESCRIPTORS

(71) Applicant: Dell Products L.P., Round Rock, TX (US)

(72) Inventors: Vladimir Shveidel, Pardes Hana-Karkur (IL); Jenny Derzhavetz, Raanana (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/422,240

(22) Filed: Jan. 25, 2024

(65) Prior Publication Data

US 2025/0244890 A1  Jul. 31, 2025

(51) Int. Cl.
*G06F 3/06* (2006.01)

(52) U.S. Cl.
CPC .......... *G06F 3/0631* (2013.01); *G06F 3/0619* (2013.01); *G06F 3/067* (2013.01)

(58) Field of Classification Search
CPC ....... G06F 3/0631; G06F 3/0619; G06F 3/067
See application file for complete search history.

(56) References Cited

U.S. PATENT DOCUMENTS

| | | | |
|---|---|---|---|
| 7,007,146 B2 | 2/2006 | Romanufa et al. | |
| 10,091,297 B1 | 10/2018 | Zhao et al. | |
| 11,340,829 B1 * | 5/2022 | Shveidel | G06F 12/0871 |
| 11,409,454 B1 | 8/2022 | Shveidel et al. | |
| 11,625,169 B2 | 4/2023 | Chen et al. | |
| 11,822,473 B2 | 11/2023 | Shveidel et al. | |
| 2020/0349072 A1 * | 11/2020 | Fliess | G06F 12/0868 |
| 2022/0342562 A1 * | 10/2022 | Baruch | G06F 12/0868 |

* cited by examiner

*Primary Examiner* — Jason W Blust
(74) *Attorney, Agent, or Firm* — BainwoodHuang (57) ABSTRACT

Techniques for using data logs with bonded page descriptors (PDs) in storage systems. The techniques include, in response to a write request from a storage client, performing, in a log structured data log, a single object allocation for a bonded page descriptor (PD)-page buffer (PB) pair, storing and persisting, in a PB of the bonded PD-PB pair, user data specified by the write request, and storing and persisting, in a PD object of the bonded PD-PB pair, metadata related to the user data. The techniques include, once the user data and related MD are stored and persisted in the bonded PD-PB pair, sending an acknowledgment message to the storage client, and de-staging, flushing, or transferring, in the background, the user data and/or related MD from the bonded PD-PB pair to a storage object. By performing a single object allocation, processing costs related to performing the object allocation can be reduced.

18 Claims, 4 Drawing Sheets

DATA LOG WITH BONDED DESCRIPTORS

BACKGROUND

Storage systems include storage processors coupled to arrays of storage devices ("storage arrays"), such as hard disk drives (HDDs), solid state drives (SSDs), and/or flash drives. The storage processors receive and service storage input/output (IO) requests (e.g., write requests, read requests) from storage client computers ("storage clients"), which send the storage IO requests to the storage systems over one or more networks. The storage IO requests specify data pages, data blocks, data files, or other data elements containing user data and/or metadata (MD) to be written ("transferred") to or read from volumes (VOLs), logical units (LUs), filesystems, or other storage objects maintained on the storage devices. The storage systems include nonvolatile cache memories that implement log structured data logs ("data logs") for use in temporarily storing and persisting the user data and/or MD specified by the write requests, before de-staging, flushing, or otherwise transferring, in the background, the user data and/or MD to one of the storage objects. Once the user data and/or MD are stored and persisted in the data logs, the storage systems send acknowledgement messages to the storage clients that sent the write requests, thereby reducing and/or stabilizing latency at the respective storage clients.

SUMMARY

In a storage system, a log structured data log ("data log") can include a pool of page buffers (PBs) and a pool of page descriptors (PDs). Each PB can be implemented as a data page (e.g., 4 kilobytes (KB), 8 KB) configured to store and persist user data to be transferred, as part of a data transfer transaction, to a storage object. Each PB can have a corresponding PD, which can be implemented as a memory object with a fixed-size block allocation (e.g., 64 bytes (B), 128B) configured to store related metadata (MD) for the data transfer transaction, such as a location (e.g., logical block address (LBA)) where the user data is to be transferred to a storage object (e.g., VOL), validation data (e.g., cyclical redundancy check (CRC) value, hash value) for the user data, a transaction sequence identifier (ID) for the data transfer transaction, and a pointer to the PB. Some PDs can be used with storage operations that do not involve transfers of data, such as x-copy operations, un-map operations, create operations, and delete operations. Further, if the pool of PDs has a ring structure, then the PDs can be used to store MD or information pertaining to head and tail pointers for the ring structure. These PDs ("standalone PDs") do not have corresponding PBs.

Unfortunately, there can be shortcomings or drawbacks to the manner in which storage systems use data logs for temporarily storing and persisting user data and/or related MD specified by write requests. For example, in response to a write request, a storage system may (i) allocate a PB (including a pointer to the PB) from a persistent PB memory pool ("PB pool") included in its data log, (ii) persist, in the allocated PB, user data specified by the write request, (iii) allocate a PD object from a persistent PD memory pool ("PD pool") included in the data log, and (iv) persist, in the allocated PD object, MD related to the user data, such as an LBA where the user data is to be transferred to a storage object (e.g., VOL), a CRC or a hash value for the user data, a transaction sequence ID for a data transfer transaction, and the pointer to the PB. Because the storage system incorporates two (2) pools of persistent storage in its data log, namely, a PB pool and a PD pool, two (2) object allocation (or reclaim) requests can be required for each write operation involving a page of user data. However, requiring two object allocation (or reclaim) requests for each write operation can increase processing costs due (at least in part) to the need to perform two (2) locking operations per pool to service the respective requests. Further, maintaining and managing the PB pool and the PD pool as a pool structure and a ring structure, respectively, can complicate object allocation (or reclaim) operations. In addition, using two pools of persistent storage (e.g., PB pool, PD pool) can increase a complexity of system recovery and/or debug and reduce system reliability, due (at least in part) to inconsistencies that can arise between the respective storage pools. Other shortcomings or drawbacks may be present in current systems, as well.

Techniques are disclosed herein for implementing and using data logs with bonded page descriptors (PDs) in storage systems. The disclosed techniques can be employed in a storage system that includes a nonvolatile cache memory that implements a log structured data log ("data log") for use in temporarily storing and persisting user data and/or related MD specified by write requests issued by storage client computers ("storage clients"). The data log can incorporate a PD pool for storing log structured data. The PD pool can include a bonded PD pool and a standalone PD pool. The bonded PD pool can include a first logical pool array ("first PD array") of PD objects, and the standalone PD pool can include a second logical pool array ("second PD array") of PD objects. Each PD object of the first PD array can be tightly coupled ("bonded") to a PB of a logical pool array ("PB array") of PBs. The disclosed techniques can include, in response to a write request from a storage client, performing a single object allocation in the data log for a bonded PD-PB pair. For example, the bonded PD-PB pair may include a PD object from the first PD array and a PB from the PB array, in which the PD object is tightly coupled to the PB. Further, the single object allocation may include allocating identical array indices for the PD object and the PB of the bonded PD-PB pair. The disclosed techniques can include storing and persisting, in the PB of the bonded PD-PB pair, user data specified by the write request, and storing and persisting, in the PD object of the bonded PD-PB pair, MD related to the user data, including, for example, an LBA where the user data is to be transferred to a storage object (e.g., VOL), a CRC or a hash value for the user data, and a transaction sequence ID for a data transfer transaction. Because, in the bonded PD-PB pair, the PD object is tightly coupled to the PB, the need to store and persist a pointer to the PB can be avoided. The disclosed techniques can include, once the user data and related MD are stored and persisted in the bonded PD-PB pair, sending an acknowledgment message to the storage client. The disclosed techniques can include de-staging, flushing, or otherwise transferring, in the background, the user data and/or related MD from the bonded PD-PB pair to the VOL. By performing, in response to each write request, a single object allocation for a bonded PD-PB pair in the data log, processing costs related to performing such object allocations can be reduced. Moreover, by using a bonded PD pool in place of separate PD and PB pools in the data log, complexities of system recovery and debug can also be reduced, thereby increasing system reliability.

In certain embodiments, a method includes, in response to a write request from a storage client, performing a single object allocation in a log structured data log for a bonded page descriptor (PD)-page buffer (PB) pair. The bonded PD-PB pair includes a bonded PD object tightly coupled to a PB. The method includes storing and persisting user data specified by the write request in the PB of the bonded PD-PB pair, and storing and persisting metadata (MD) related to the user data in the bonded PD object of the bonded PD-PB pair. The method includes, once the user data and related MD are stored and persisted in the bonded PD-PB pair, sending an acknowledgment message to the storage client, and de-staging, flushing, or transferring, in the background, the user data and/or the related MD from the bonded PD-PB pair to a storage object.

In certain arrangements, the bonded PD object is one of a plurality of bonded PD objects in a logical pool array of bonded PD objects, and the PB is one of a plurality of PBs in a logical pool array of PBs. The method includes allocating the same identical array index for each of the bonded PD object and the PB of the bonded PD-PB pair.

In certain arrangements, the method includes, in response to a request to service a storage operation, performing an object allocation in the log structured data log for a standalone PD object. The standalone PD object is not coupled to any PB.

In certain arrangements, the bonded PD object is one of a plurality of bonded PD objects in a logical pool array of bonded PD objects, the standalone PD object is one of a plurality of standalone PD objects in a logical pool array of standalone PD objects, and the logical pool array of bonded PD objects and the logical pool array of standalone PD objects correspond to separate portions of a shared logical pool array of PD objects. The method includes allocating a first range of array indices of the shared logical pool array of PD objects for the logical pool array of bonded PD objects, and allocating a second range of array indices of the shared logical pool array of PD objects for the logical pool array of standalone PD objects.

In certain arrangements, the method includes storing and persisting MD related to a storage operation in the standalone PD object.

In certain arrangements, the MD stored and persisted in the bonded PD object includes a first transaction sequence identifier (ID) for the write request, and the MD stored and persisted in the standalone PD object includes a second transaction sequence ID for the storage operation. The method includes servicing the write request and the storage operation in a time dependent order based on the first transaction sequence ID and the second transaction sequence ID.

In certain arrangements, the bonded PD object and the standalone PD object belong to a logical pool array of PD objects. The method includes performing a recovery operation to determine data inconsistencies resulting from corruption/non-corruption of the user data, the MD related to the user data, and/or the MD related to the storage operation.

In certain arrangements, the method includes, in the recovery operation, walking through the logical pool array of PD objects in time order using at least the first transaction ID and the second transaction ID, and replaying each bonded PD object and/or standalone PD object determined to contain valid MD.

In certain arrangements, the bonded PD object has a fixed-size block allocation, and the log structured data log has a media granularity greater than the fixed-size block allocation of the bonded PD object. The method includes packing the bonded PD object having the fixed-size block allocation into a physical block having a size that corresponds to the media granularity of the log structured data log.

In certain embodiments, a system includes a memory, and processing circuitry configured to execute program instructions out of the memory to, in response to a write request from a storage client, perform a single object allocation in a log structured data log for a bonded page descriptor (PD)-page buffer (PB) pair. The bonded PD-PB pair includes a bonded PD object tightly coupled to a PB. The processing circuitry is configured to execute the program instructions out of the memory to store and persist user data specified by the write request in the PB of the bonded PD-PB pair, and store and persist metadata (MD) related to the user data in the bonded PD object of the bonded PD-PB pair. The processing circuitry is configured to execute the program instructions out of the memory to, once the user data and related MD are stored and persisted in the bonded PD-PB pair, send an acknowledgment message to the storage client, and de-stage, flush, or transfer, in the background, the user data and/or the related MD from the bonded PD-PB pair to a storage object.

In certain arrangements, the bonded PD object is one of a plurality of bonded PD objects in a logical pool array of bonded PD objects, and the PB is one of a plurality of PBs in a logical pool array of PBs. The processing circuitry is configured to execute the program instructions out of the memory to allocate the same identical array index for each of the bonded PD object and the PB of the bonded PD-PB pair.

In certain arrangements, the processing circuitry is configured to execute the program instructions out of the memory to, in response to a request to service a storage operation, perform an object allocation in the log structured data log for a standalone PD object. The standalone PD object is not coupled to any PB.

In certain arrangements, the bonded PD object is one of a plurality of bonded PD objects in a logical pool array of bonded PD objects, the standalone PD object is one of a plurality of standalone PD objects in a logical pool array of standalone PD objects, and the logical pool array of bonded PD objects and the logical pool array of standalone PD objects correspond to separate portions of a shared logical pool array of PD objects. The processing circuitry is configured to execute the program instructions out of the memory to allocate a first range of array indices of the shared logical pool array of PD objects for the logical pool array of bonded PD objects, and to allocate a second range of array indices of the shared logical pool array of PD objects for the logical pool array of standalone PD objects.

In certain arrangements, the processing circuitry is configured to execute the program instructions out of the memory to store and persist MD related to a storage operation in the standalone PD object.

In certain arrangements, the MD stored and persisted in the bonded PD object includes a first transaction sequence identifier (ID) for the write request, and the MD stored and persisted in the standalone PD object includes a second transaction sequence ID for the storage operation. The processing circuitry is configured to execute the program instructions out of the memory to service the write request and the storage operation in a time dependent order based on the first transaction sequence ID and the second transaction sequence ID.

In certain arrangements, the bonded PD object and the standalone PD object belong to a logical pool array of PD objects. The processing circuitry is configured to execute the program instructions out of the memory to perform a recovery operation to determine data inconsistencies resulting from corruption/non-corruption of the user data, the MD related to the user data, and/or the MD related to the storage operation.

In certain arrangements, the processing circuitry is configured to execute the program instructions out of the memory to walk through the logical pool array of PD objects in time order using at least the first transaction ID and the second transaction ID, and to replay each bonded PD object and/or standalone PD object determined to contain valid MD.

In certain arrangements, the bonded PD object has a fixed-size block allocation, and the log structured data log has a media granularity greater than the fixed-size block allocation of the bonded PD object. The processing circuitry is configured to execute the program instructions out of the memory to pack the bonded PD object having the fixed-size block allocation into a physical block having a size that corresponds to the media granularity of the log structured data log.

In certain embodiments, a computer program product includes a set of non-transitory, computer-readable media having instructions that, when executed by processing circuitry, cause the processing circuitry to perform a method including, in response to a write request from a storage client, performing a single object allocation in a log structured data log for a bonded page descriptor (PD)-page buffer (PB) pair. The bonded PD-PB pair includes a bonded PD object tightly coupled to a PB. The method includes storing and persisting user data specified by the write request in the PB of the bonded PD-PB pair, and storing and persisting metadata (MD) related to the user data in the bonded PD object of the bonded PD-PB pair. The method includes, once the user data and related MD are stored and persisted in the bonded PD-PB pair, sending an acknowledgment message to the storage client, and de-staging, flushing, or transferring, in the background, the user data and/or the related MD from the bonded PD-PB pair to a storage object.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for implementing and using data logs with bonded page descriptors (PDs) in storage systems. The disclosed techniques can include, in response to a storage input/output (IO) request (e.g., write request) from a storage client computer ("storage client"), performing, in a log structured data log ("data log"), a single object allocation for a bonded page descriptor (PD)-page buffer (PB) pair. The disclosed techniques can include storing and persisting, in a PB of the bonded PD-PB pair, user data specified by the write request, and storing and persisting, in a PD object of the bonded PD-PB pair, metadata (MD) related to the user data. The disclosed techniques can include, once the user data and related MD are stored and persisted in the bonded PD-PB pair, sending an acknowledgment message to the storage client. The disclosed techniques can include de-staging, flushing, or otherwise transferring, in the background, the user data and/or related MD from the bonded PD-PB pair to a storage object (e.g., volume (VOL)). By performing, in response to a write request, a single object allocation for a bonded PD-PB pair in a data log, processing costs related to performing the object allocation can be reduced. Moreover, by using a bonded PD pool in place of separate PD and PB pools in the data log, complexities of system recovery and debug can also be reduced, thereby increasing system reliability.

Figure 1:
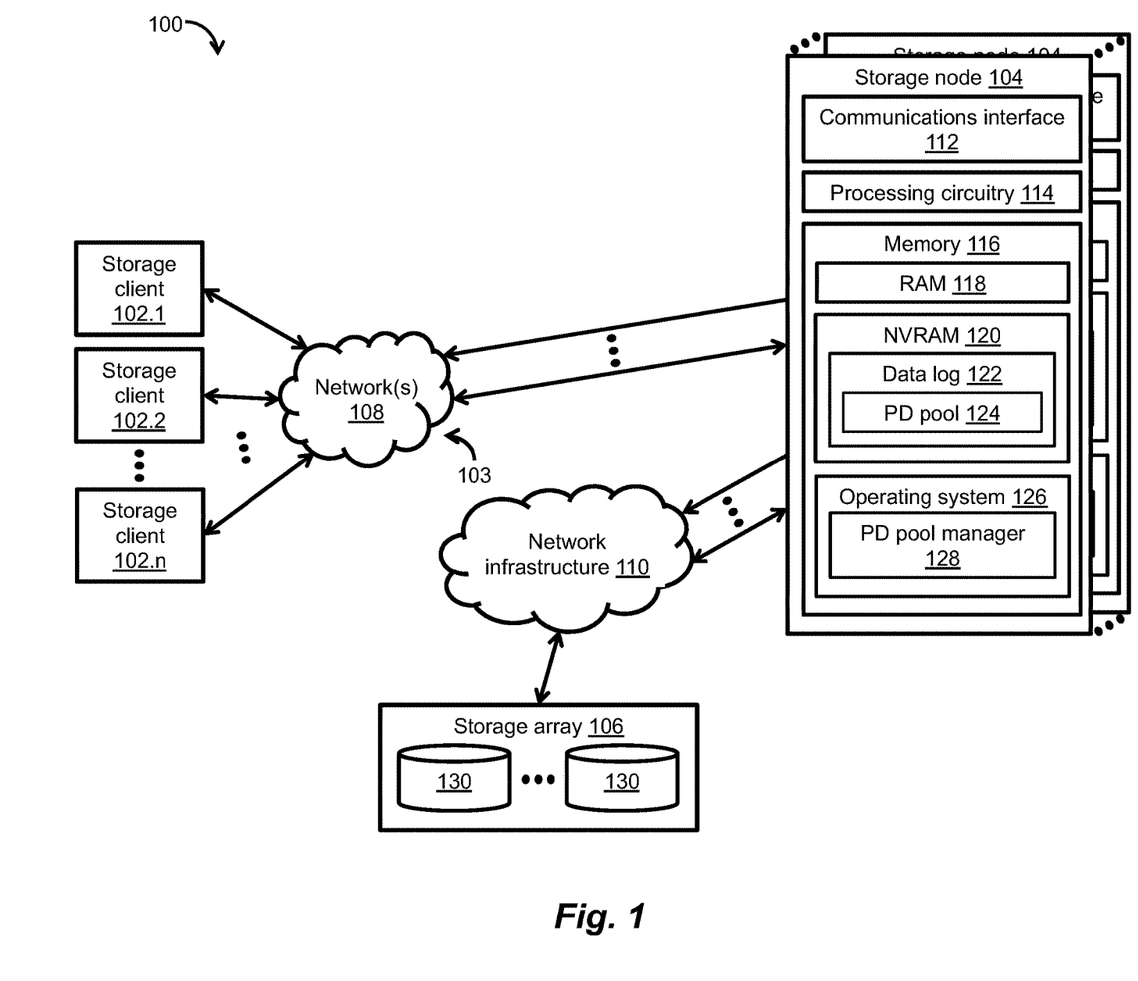
FIG. 1 is a block diagram of an exemplary storage environment, in which techniques can be practiced for implementing and using data logs with bonded page descriptors (PDs) in storage systems.

FIG. 1 depicts an illustrative embodiment of an exemplary storage environment 100 for implementing and using data logs with bonded PDs in storage systems. As shown in FIG. 1, the storage environment 100 can include a plurality of storage clients 102.1, . . . , 102.n, a plurality of storage processors ("storage nodes") including a storage node 104, a storage array 106, and a communications medium 103 that includes at least one network 108. The plurality of storage clients 102.1, . . . , 102.n can be configured to provide, over the network(s) 108, storage IO requests (e.g., small computer system interface (SCSI) commands, network file system (NFS) commands) to the storage node 104. Such storage IO requests (e.g., write requests, read requests) can direct the storage node 104 to write and/or read data pages, data blocks, data files, or any other suitable data elements to/from volumes (VOLs), virtual volumes (VVOLs) (e.g., VMware® VVOLs), logical units (LUs), filesystems, directories, files, or any other suitable storage objects maintained on one or more storage devices 130 (e.g., hard disk drives (HDDs), solid state drives (SSDs), flash drives) of a storage array 106.

The communications medium 103 can be configured to interconnect the plurality of storage clients 102.1, . . . , 102.n with the storage node 104 to enable them to communicate and exchange data and/or control signaling. As shown in FIG. 1, the communications medium 103 is illustrated as a "cloud" to represent different network topologies, such as a storage area network (SAN) topology, a network attached storage (NAS) topology, a local area network (LAN) topology, a metropolitan area network (MAN) topology, a wide area network (WAN) topology, and so on. As such, the communications medium 103 can include copper-based data communications devices and cabling, fiber optic devices and cabling, wireless devices, and so on, or any suitable combination thereof.

The storage node 104 can be connected directly to the storage array 106 or via a network infrastructure 110, which can include an Ethernet network, an InfiniBand network, a fiber channel network, and/or any other suitable network. As shown in FIG. 1, the storage node 104 can include a communications interface 112, processing circuitry 114, and a memory 116. The communications interface 112 can include an Ethernet interface, an InfiniBand interface, a fiber channel interface, or any other suitable communications interface. The communications interface 112 can further include SCSI target adapters, network interface adapters, or any other suitable adapters for converting electronic, optical, and/or wireless signals received over the network(s) 108 to a form suitable for use by the processing circuitry 114. The processing circuitry 114 (e.g., central processing unit (CPU)) can include a set of processing cores (e.g., CPU cores) configured to execute specialized code and data as program instructions out of the memory 116, process storage IO requests (e.g., write requests, read requests) issued by the storage clients 102.1, . . . , 102.n, and store user data and/or MD to one or more of the storage devices 130 of the storage array 106 within the storage environment 100, which can be a clustered redundant array of independent disks (RAID) environment.

The memory 116 can include volatile memory (e.g., random access memory (RAM)) 118, and nonvolatile memory (e.g., nonvolatile RAM (NVRAM)) 120. As shown in FIG. 1, the NVRAM 120 can include a log structured data log ("data log") 122 that incorporates a PD pool 124 for storing log structured data and/or MD. The PD pool 124 can temporarily store and persist user data and related MD specified by write requests issued by the storage clients 102.1, 102.n, before the user data and/or related MD are de-staged, flushed, or otherwise transferred, in the background, to storage objects (e.g., VOLs) maintained on the storage devices 130 of the storage array 106. The RAM 118 can include a volatile memory structure for temporarily storing records of the user data and related MD specified by the write requests. The memory 116 can accommodate an operating system (OS) 126, such as a Linux OS, Unix OS, Windows OS, or any other suitable OS, as well as specialized software modules including a PD pool manager 128.

Figure 2:
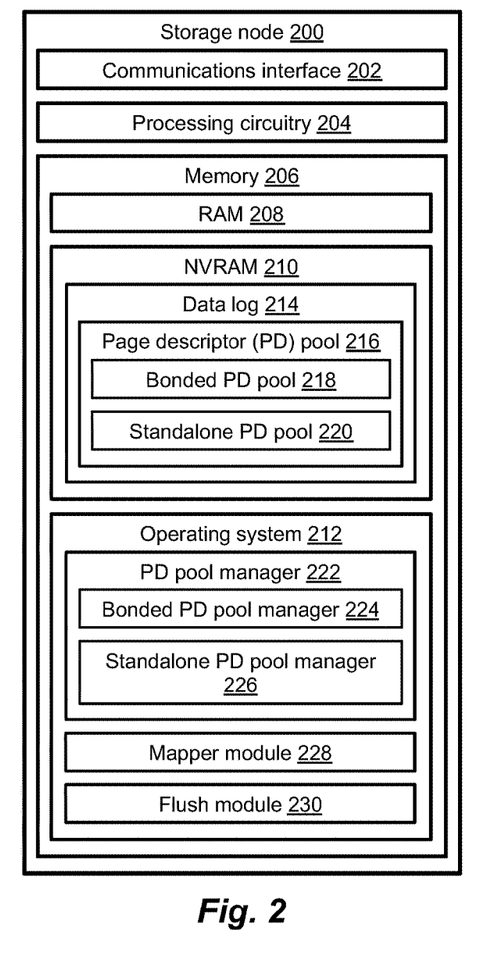
FIG. 2 is a block diagram of an exemplary storage node included in the storage environment of FIG. 1, in which the storage node implements an exemplary log structured data log ("data log") that incorporates a PD pool including a bonded PD pool and a standalone PD pool.

FIG. 2 depicts another exemplary storage node 200 that can be included in the storage environment 100 of FIG. 1. It is noted that each storage node 104 of FIG. 1 can be configured like the storage node 200 of FIG. 2. As shown in FIG. 2, the storage node 200 can include a communications interface 202 and processing circuitry 204, which can be configured like the communications interface 112 and processing circuitry 114, respectively, as described herein with reference to FIG. 1. The storage node 200 can further include a memory 206, including a RAM 208 and an NVRAM 210. The NVRAM 210 can include a data log 214, which can incorporate a PD pool 216 for storing log structured data. The PD pool 216 can include a bonded PD pool 218 and a standalone PD pool 220. The bonded PD pool 218 can accommodate a plurality of tightly coupled ("bonded") PD-PB pairs, as described herein with reference to FIG. 3. Like the memory 116 of FIG. 1, the memory 206 of FIG. 2 can accommodate an operating system (OS) 212 and a PD pool manager 222, which can include a manager ("bonded PD pool manager") 224 for the bonded PD pool 218, as well as a manager ("standalone PD pool manager") 226 for the standalone PD pool 220. The bonded PD pool manager 224 and the standalone PD pool manager 226 can be responsible for managing object allocation (or reclaim) operations and requests, validation operations and requests, log operations and requests, and so on, performed on the bonded PD pool 218 and the standalone PD pool 220, respectively.

The memory 206 can accommodate additional specialized software modules including a mapper module 228 and a flush module 230. In one embodiment, the mapper module 228 can implement a tree structure for use in storing and persisting user data and/or MD to storage objects (e.g., VOLs, VVOLs, LUs, filesystems, directories, files) maintained on the storage devices 130 (e.g., HDDs. SSDs, flash drives) of the storage array 106. In one embodiment, the tree structure can be configured as a B-tree that includes multiple hierarchical levels for accommodating root pages, top pages, middle ("mid") pages, and leaf pages. The root pages can provide a logical address space with pointers to respective ones of the top pages, which can be configured with pointers to respective ones of the mid-pages. Further, the mid-pages can be configured with pointers to respective ones of the leaf pages, which can be configured with pointers to virtual large blocks (VLBs). The VLBs can include reference counts, data compression maps, and accounting information for physical large blocks (PLBs), each of which can provide a physical address space (e.g., 2 megabytes (MB)) for storing user data. In response to a write request, user data specified by the write request can be temporarily stored and persisted in a PB of a bonded PD-PB pair, and MD related to the user data can be temporarily stored and persisted in a PD object of the bonded PD-PB pair. The PD object can be organized into a structure of a leaf page of the B-tree implemented by the mapper module 228. In response to a fullness level of the PD pool 216 (e.g., to prevent pool exhaust) or a flush optimality condition (e.g., relating to a prioritization of user data/MD pages to be written to contiguous storage segments, or a collection of user data pages that allows updates to be forced to the same MD pages), the flush module 230 can access the leaf page structure of the B-tree to obtain, from the PD object, MD related to the user data stored and persisted in the PB, and use descriptive information contained in the MD to de-stage, flush, or otherwise transfer, in the background, the user data and/or related MD to a storage object (e.g., VOL) maintained on the storage device(s) 130 of the storage array 106.

Figure 3:
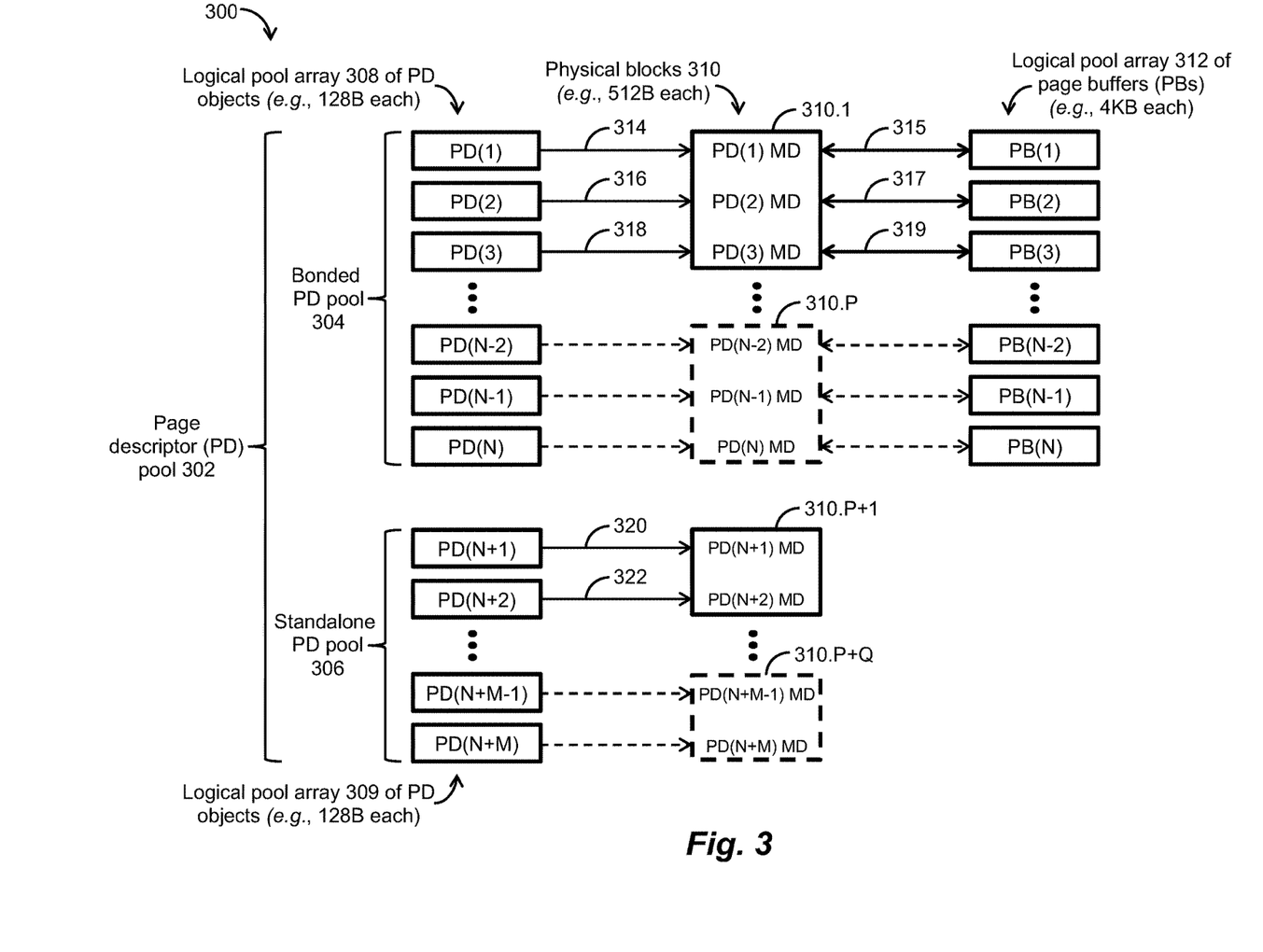
FIG. 3 is a block diagram of an exemplary layout of the data log of FIG. 2, including the bonded PD pool and the standalone PD pool.

FIG. 3 depicts an exemplary layout of a data log 300 that incorporates a PD pool 302 for storing log structured data. The PD pool 302 can include a bonded PD pool 304 and a standalone PD pool 306. It is noted that each of the data log 122 of FIG. 1 and the data log 214 of FIG. 2 can be implemented with a layout like that of the data log 300 of FIG. 3. As shown in FIG. 3, the bonded PD pool 304 can have a pool structure that includes a logical pool array 308 of PD objects, PD(1), PD(2), PD(3) . . . , PD(N−2), PD(N−D), PD(N), and a logical pool array 312 of PBs. PB(1), PB(2), PB(3), . . . . PB(N−2), PB(N−1), PB(N), in which "N" corresponds to a positive integer. Further, the standalone PD pool 306 can include a logical pool array 309 of PD objects, PD(N+1), PD(N+2), . . . , PD(N+M−1), PD(N+M), in which "N" and "M" correspond to positive integers. In the bonded PD pool 304, each PB(1), PB(2), . . . , PB(N) of the logical pool array 312 can be implemented as a data page (e.g., 4 kilobytes (KB), 8 KB) configured to store user data to be transferred, as part of a data transfer transaction, to a storage object (e.g., VOL). In the bonded PD pool 304, each PD(1), PD(2), . . . , PD(N) of the logical pool array 308 can be implemented as a memory object with a fixed-size block allocation (e.g., 64 bytes (B), 128B) configured to store descriptive information for the data transfer transaction, including, for example, a location (e.g., logical block address (LBA)) where the user data is to be transferred to the storage object (e.g., VOL), validation data (e.g., cyclical redundancy check (CRC) value, hash value) for the user data, and a transaction sequence identifier (ID) for the data transfer transaction. In the standalone PD pool 306, each PD(N+1), PD(N+2), . . . , PD(N+M) of the logical pool array 309 can be implemented as a memory object with a fixed-size block allocation (e.g., 64B, 128B) configured to store descriptive information for storage operations that do not involve transfers of data, such as x-copy operations, un-map operations, create operations, and/or delete operations. In one embodiment, the logical pool array 308 of the bonded PD pool 304 (see FIG. 3) and the logical pool array 309 of the standalone pool 306 (see FIG. 3) can correspond to separate portions of a shared logical pool array of PD objects, PD(1), PD(2), . . . , PD(N), PD(N+1), PD(N+2), . . . , PD(N+M). As such, the PD objects, PD(1), PD(2), . . . , PD(N), of the logical pool array 308 can be allocated a lower range of array indices, 1, 2, . . . , N, of the shared logical pool array of PD objects, and the PD objects, PD(N+1), PD(N+2), . . . , PD(N+M) of the logical pool array 309, can be allocated an upper range of array indices, N+1, N+2, . . . , N+M, of the shared logical pool array of PD objects. It is noted that modifications to the layout of the data log 300, including the bonded PD pool 304 and the standalone PD pool 306, are possible without departing from the inventive concepts described herein.

The disclosed techniques for implementing and using data logs with bonded page descriptors (PDs) in storage systems will be further understood with reference to the following illustrative example and FIGS. 2 and 3. In this example, it is assumed that the data log 214 of the storage node 200 (see FIG. 2) has a layout like that of the data log 300 (see FIG. 3). As described herein, the data log 300 incorporates the PD pool 302, which includes the bonded PD pool 304 and the standalone PD pool 306. The bonded PD pool 304 can include the logical pool array 308 of PD objects, PD(1), PD(2), PD(3), . . . . PD(N−2), PD(N−1). PD(N), and the standalone PD pool 306 can include the logical pool array 309 of PD objects. PD(N+1), PD(N+2), . . . , PD(N+M−1), PD(N+M). As such, the logical pool array 308 and the logical pool array 309 can correspond to separate portions of a shared logical pool array of PD objects, PD(1), PD(2), . . . , PD(N), PD(N+1), PD(N+2), . . . , PD(N+M). Each PD object of the logical pool array 308 can be tightly coupled ("bonded") to a PB of the logical pool array 312 of PBs, PB(1), PB(2), PB(3), . . . , PB(N−2). PB(N−1), PB(N).

In this example, in response to a write request from a storage client, the bonded PD pool manager 224 included in the storage node 200 issues a single object allocation request for a bonded PD(1)-PB(1) pair, which includes the PD object, PD(1), from the logical pool array 308, and the PB, PB(1), from the logical pool array 312. The single object allocation request includes a request to allocate the same identical array index "1" for each of the PD object, PD(1), and the PB, PB(1), of the bonded PD(1)-PB(1) pair. As employed herein, the term "bonded" refers to a dependency between a PD object and a PB of a PD-PB pair, where such dependency comes into existence due to the PD object and the PB of the PD-PB pair sharing the same identical array index. Having performed a single object allocation for the bonded PD(1)-PB(1) pair including the PD object, PD(1), and the PB, PB(1), the storage node 200 stores and persists, in the PB, PB(1), user data specified by the write request, and stores and persists, in the PD object, PD(1), metadata (MD) related to the user data, such as a logical block address (LBA) where the user data is to be transferred to a storage object (e.g., VOL), a cyclical redundancy check (CRC) or a hash value for the user data, and a transaction sequence identifier (ID) for a data transfer transaction. As employed herein, the term "transaction sequence identifiers (IDs)" refers to unique monotonically increasing IDs (e.g., numbers), which are assigned to PD objects as they are used in storage IO requests (e.g., write requests, read requests) or storage operations (e.g., x-copy, un-map, create, and/or delete operations). Transaction sequence IDs can denote a time dependent ordering of such storage IO requests or storage operations. For example, a first PD object that stores and persists a transaction sequence ID (e.g., number) having a value less than the transaction sequence ID (e.g., number) stored and persisted by a second PD object may be assumed to have been committed, via a transaction commit operation, before the second PD object, regardless of PD type (e.g., bonded, standalone). Once the user data and related MD have been stored and persisted in the bonded PD(1)-PB(1) pair, the storage node 200 sends an acknowledgment message to the storage client.

In likewise fashion, in response to each subsequent write request from the storage client, the bonded PD pool manager 224 included in the storage node 200 issues a single object allocation request for each additional bonded PD-PB pair. In this example, the bonded PD pool manager 224 issues a single object allocation request for a bonded PD(2)-PB(2) pair, which includes the PD object. PD(2), from the logical pool array 308, and the PB. PB(2), from the logical pool array 312, as well as a single object allocation request for a bonded PD(3)-PB(3) pair, which includes the PD object. PD(3), from the logical pool array 308, and the PB. PB(3), from the logical pool array 312. Like the bonded PD(1)-PB (1) pair that includes the PD object, PD(1), and the PB, PB(1), the same identical array index "2" is allocated for each of the PD object. PD(2), and the PB, PB(2), of the bonded PD(2)-PB(2) pair, and the same identical array index "3" is allocated for each of the PD object, PD(3), and the PB, PB(3), of the bonded PD(3)-PB(3) pair.

In addition, the storage node 200 performs several storage operations that do not involve transfers of data, such as x-copy operations, un-map operations, create operations, and/or delete operations. For these storage operations, the standalone PD pool manager 226 included in the storage node 200 issues object allocation requests for standalone PD objects, such as the standalone PD object, PD(N+1) and the standalone PD object, PD(N+2), from the logical pool array 309. Having serviced the object allocation requests for the standalone PD object, PD(N+1) and the standalone PD object, PD(N+2), the storage node 200 stores and persists, in the standalone PD objects PD(N+1). PD(N+2), metadata (MD) such as transaction sequence IDs for corresponding storage transactions. Because these storage operations do not involve data transfers, the standalone PD objects, PD(N+ 1). PD(N+2), do not have corresponding PBs. It is noted that such transaction sequence IDs can be stored and persisted in PD objects, regardless of PD type (e.g., bonded, standalone).

In this example, each PD object, PD(1), PD(2), PD(3), of the logical pool array 308, as well as each PD object, PD(N+1), PD(N+2), of the logical pool array 309, is implemented as a memory object with a fixed-size block allocation of 128 bytes (B) (or any other suitable size). However, in this example, the data log 300 has a larger media granularity of 512B (or any other suitable media granularity). To accommodate the larger media granularity of the data log 300, MD contained in the 128B PD objects, PD(1), PD(2), PD(3), are packed into a 512B physical block 310.1, as illustrated by reference arrows 314, 316, 318, respectively. Likewise, MD contained in the 128B PD objects, PD(N+1), PD(N+2), are packed into a 512B physical block 310.P+1, as illustrated by reference arrows 320, 322, respectively. A plurality of such 512B physical blocks 310 can be used to accommodate the media granularity of the data log 300, including a 512B physical block 310.P (shown in phantom) where possible MD contained in the 128B PD objects, PD(N−2), PD(N−1), PD(N), may be packed, as well as a 512B physical block 310.P+Q (shown in phantom)

where possible MD contained in the 128B PD objects, PD(N+M−1), PD(N+M) may be packed. In this example, up to four (4) 128B PD objects may be packed into each 512B physical block. It is noted that, if MD contained in at least one of several 128B PD objects packed into a single 512B physical block is updated, then the entire 512B physical block may be rewritten from memory, while performing a locking operation on the 512B physical block to assure MD consistency.

As shown in FIG. 3, a bond between the PD object, PD(1), and the PB, PB(1), of the bonded PD(1)-PB(1) pair is illustrated by a double-headed reference arrow 315. Further, a bond between the PD object, PD(2), and the PB, PB(2), of the bonded PD(2)-PB(2) pair is illustrated by a double-headed reference arrow 317, and a bond between the PD object, PD(3), and the PB, PB(3), of the bonded PD(3)-PB(3) pair is illustrated by a double-headed reference arrow 319. Such bonds may also exist between the PD object, PD(N−2), and the PB, PB(N−2), of a possible bonded PD(N−2)-PB(N−2) pair, between the PD object, PD(N−1), and the PB, PB(N−1), of a possible bonded PD(N−1)-PB(N−1) pair, and between the PD object, PD(N), and the PB, PB(N), of a possible bonded PD(N)-PB(N) pair.

As described herein, a PD object of a bonded PD-PB pair can be organized into a leaf page structure of a B-tree. Further, in response to a fullness level of the PD pool 302 (e.g., to prevent pool exhaust) or a flush optimality condition (e.g., relating to a prioritization of user data/MD pages to be written to contiguous storage segments, or a collection of user data pages that allows updates to be forced to the same MD pages), the leaf page structure of the B-tree can be accessed to obtain, from the PD object, MD related to user data stored and persisted in a PB of the bonded PD-PB pair, and descriptive information for use in de-staging, flushing, or otherwise transferring, in the background, the user data and/or related MD to a storage object (e.g., VOL) maintained on the storage device(s) 130 of the storage array 106. In this way, the storage node 200 of this example can use descriptive information contained in the MD of the PD object, PD(1), of the bonded PD(1)-PB(1) pair to de-stage, flush, or otherwise transfer user data from the PB, PB(1), and/or related MD to a storage object. Likewise, the storage node 200 can use descriptive information contained in the MD of the PD object, PD(2), of the bonded PD(2)-PB(2) pair to de-stage, flush, or otherwise transfer user data from the PB. PB(2), and/or related MD to a storage object, and use descriptive information contained in the MD of the PD object, PD(3), of the bonded PD(3)-PB(3) pair to de-stage, flush, or otherwise transfer user data from the PB. PB(3), and/or related MD to a storage object.

As further described herein, by using the bonded PD pool 304 in place of separate PD and PB pools in the data log 300, complexities of system recovery and debug can be reduced, thereby increasing system reliability. In this example, the storage node 200 can perform a recovery operation to determine data inconsistencies resulting from corruption/ non-corruption of user data and/or metadata (MD). In one embodiment, the recovery operation can include "walking" through the PD pool 302 in time order using transaction sequence IDs, and replaying all PD objects (bonded and/or standalone) determined to be valid. For example, each PD object of a bonded PD-PB pair may be validated with a corresponding PB of the bonded PD-PB pair. If the recovery operation fails to read user data at a logical block address (LBA), then it can load the LBA's related log metadata (MD) from a storage device to distinguish between a possible data corruption and memory leak (e.g., out-of-memory condition). Moreover, the complexity of system debug can be significantly reduced due to the tight coupling of each PD-PB pair in the bonded PD pool 304. Such tight couplings of PD-PB pairs can provide assurances that multiple (e.g., more than one) PD objects in the logical pool array 308 do not make reference to, correspond to, or otherwise be associated with, the same PB in the logical pool array 312.

Figure 4:
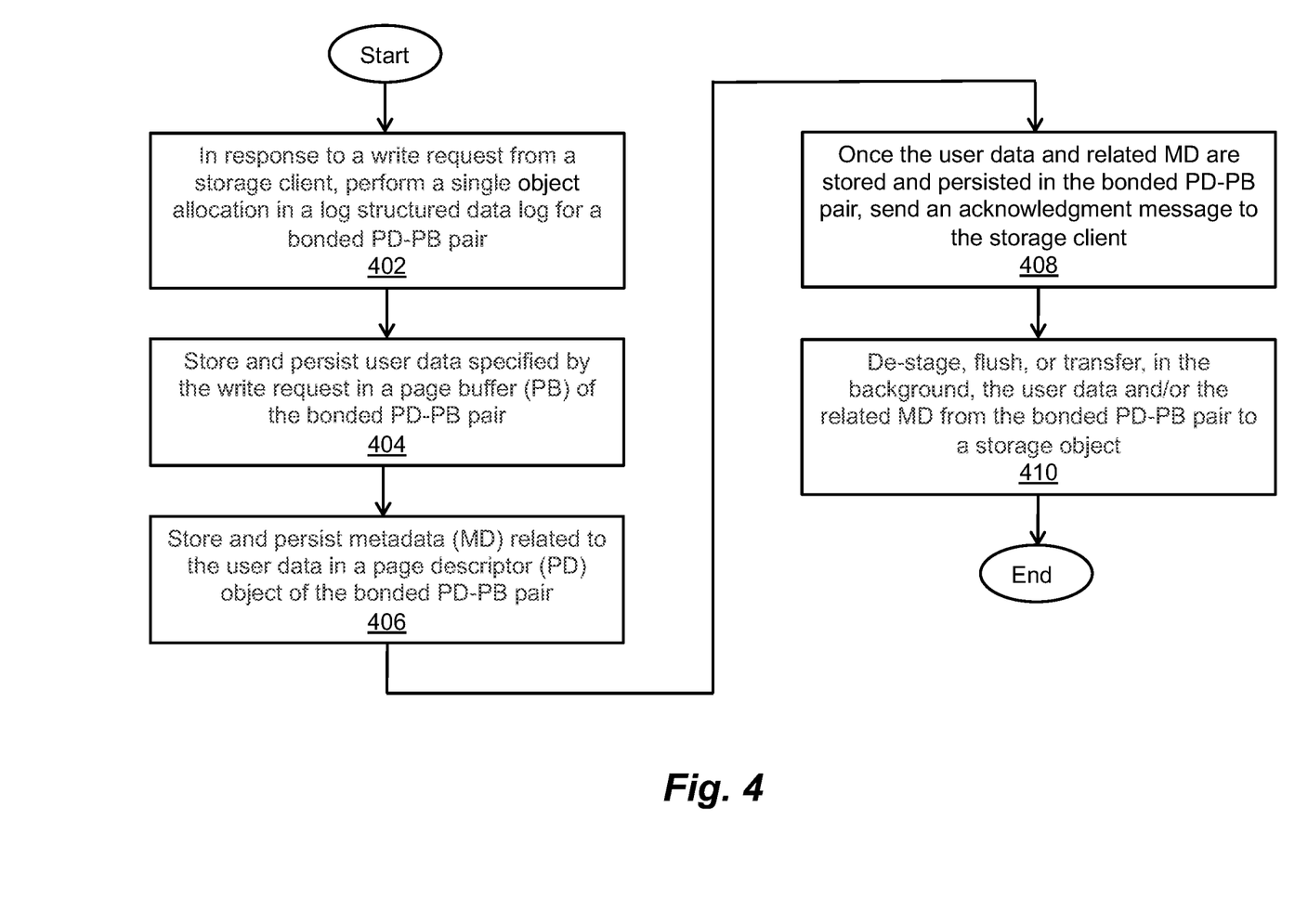
FIG. 4 is a flow diagram of an exemplary method of using data logs with bonded PDs in storage systems.

An exemplary method of using data logs with bonded PDs in storage systems is described below with reference to FIG. 4. As depicted in block 402, in response to a write request from a storage client, a single object allocation is performed in a log structured data log for a bonded PD-PB pair. As depicted in block 404, user data specified by the write request are stored and persisted in a PB of the bonded PD-PB pair. As depicted in block 406, metadata (MD) related to the user data are stored and persisted in a PD object of the bonded PD-PB pair. As depicted in block 408, once the user data and related MD are stored and persisted in the bonded PD-PB pair, an acknowledgment message is sent to the storage client. As depicted in block 410, the user data and/or the related MD are de-staged, flushed, or transferred, in the background, from the bonded PD-PB pair to a storage object.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client", "host", and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume".

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as", "for example", "e.g.", "exemplary", and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
   receiving a write request from a storage client;
   in response to the write request from the storage client, performing a single object allocation in a log structured data log for a bonded page descriptor (PD)-page buffer (PB) pair, the bonded PD-PB pair including a bonded PD object tightly coupled to a PB;
   storing and persisting user data specified by the write request in the PB of the bonded PD-PB pair;
   storing and persisting metadata (MD) related to the user data in the bonded PD object of the bonded PD-PB pair;
   once the user data and related MD are stored and persisted in the bonded PD-PB pair, sending an acknowledgment message to the storage client;
   de-staging, flushing, or transferring, in the background, the user data and/or the related MD from the bonded PD-PB pair to a storage object;
   receiving a request to service a storage operation; and
   in response to the request to service the storage operation, performing an object allocation in the log structured data log for a standalone PD object, the standalone PD object not being coupled to any PB.

2. The method of claim 1 wherein the bonded PD object is one of a plurality of bonded PD objects in a logical pool array of bonded PD objects, wherein the PB is one of a plurality of PBs in a logical pool array of PBs, and wherein the performing of the single object allocation includes allocating the same identical array index for each of the bonded PD object and the PB of the bonded PD-PB pair.

3. The method of claim 1 wherein the bonded PD object is one of a plurality of bonded PD objects in a logical pool array of bonded PD objects, wherein the standalone PD object is one of a plurality of standalone PD objects in a logical pool array of standalone PD objects, wherein the logical pool array of bonded PD objects and the logical pool array of standalone PD objects correspond to separate portions of a shared logical pool array of PD objects, and wherein the method comprises:
   allocating a first range of array indices of the shared logical pool array of PD objects for the logical pool array of bonded PD objects; and
   allocating a second range of array indices of the shared logical pool array of PD objects for the logical pool array of standalone PD objects.

4. The method of claim 1 comprising:
   storing and persisting MD related to a storage operation in the standalone PD object.

5. The method of claim 4 wherein the MD stored and persisted in the bonded PD object includes a first transaction sequence identifier (ID) for the write request, wherein the MD stored and persisted in the standalone PD object includes a second transaction sequence ID for the storage operation, and wherein the method comprises:
   servicing the write request and the storage operation in a time dependent order based on the first transaction sequence ID and the second transaction sequence ID.

6. The method of claim 5 wherein the bonded PD object and the standalone PD object belong to a logical pool array of PD objects, and wherein the method comprises:
   performing a recovery operation to determine data inconsistencies resulting from corruption/non-corruption of the user data, the MD related to the user data, and/or the MD related to the storage operation.

7. The method of claim 6 comprising:
   in the recovery operation, walking through the logical pool array of PD objects in time order using at least the first transaction ID and the second transaction ID, and replaying each bonded PD object and/or standalone PD object determined to contain valid MD.

8. The method of claim 1 wherein the bonded PD object has a fixed-size block allocation, wherein the log structured data log has a media granularity greater than the fixed-size block allocation of the bonded PD object, and wherein the method comprises:
   packing the bonded PD object having the fixed-size block allocation into a physical block having a size that corresponds to the media granularity of the log structured data log.

9. A system comprising:
   a memory; and
   processing circuitry configured to execute program instructions out of the memory to:
      receive a write request from a storage client;
      In response to the write request from the storage client, perform a single object allocation in a log structured data log for a bonded page descriptor (PD)-page buffer (PB) pair, the bonded PD-PB pair including a bonded PD object tightly coupled to a PB;
      store and persist user data specified by the write request in the PB of the bonded PD-PB pair;
      store and persist metadata (MD) related to the user data in the bonded PD object of the bonded PD-PB pair;
      once the user data and related MD are stored and persisted in the bonded PD-PB pair, send an acknowledgment message to the storage client; and
      de-stage, flush, or transfer, in the background, the user data and/or the related MD from the bonded PD-PB pair to a storage object;
      receive a request to service a storage operation; and
      in response to the request to service the storage operation, perform an object allocation in the log structured data log for a standalone PD object, the standalone PD object not being coupled to any PB.

10. The system of claim 9 wherein the bonded PD object is one of a plurality of bonded PD objects in a logical pool array of bonded PD objects, wherein the PB is one of a plurality of PBs in a logical pool array of PBs, and wherein the processing circuitry is configured to execute the program instructions out of the memory to allocate the same identical array index for each of the bonded PD object and the PB of the bonded PD-PB pair.

11. The system of claim 9 wherein the bonded PD object is one of a plurality of bonded PD objects in a logical pool array of bonded PD objects, wherein the standalone PD object is one of a plurality of standalone PD objects in a logical pool array of standalone PD objects, wherein the logical pool array of bonded PD objects and the logical pool array of standalone PD objects correspond to separate portions of a shared logical pool array of PD objects, and wherein the processing circuitry is configured to execute the program instructions out of the memory to allocate a first range of array indices of the shared logical pool array of PD objects for the logical pool array of bonded PD objects, and to allocate a second range of array indices of the shared logical pool array of PD objects for the logical pool array of standalone PD objects.

12. The system of claim 9 wherein the processing circuitry is configured to execute the program instructions out of the memory to store and persist MD related to a storage operation in the standalone PD object.

13. The system of claim 12 wherein the MD stored and persisted in the bonded PD object includes a first transaction sequence identifier (ID) for the write request, wherein the MD stored and persisted in the standalone PD object includes a second transaction sequence ID for the storage operation, and wherein the processing circuitry is configured to execute the program instructions out of the memory to service the write request and the storage operation in a time dependent order based on the first transaction sequence ID and the second transaction sequence ID.

14. The system of claim 13 wherein the bonded PD object and the standalone PD object belong to a logical pool array of PD objects, and wherein the processing circuitry is configured to execute the program instructions out of the memory to perform a recovery operation to determine data inconsistencies resulting from corruption/non-corruption of the user data, the MD related to the user data, and/or the MD related to the storage operation.

15. The system of claim 14 wherein the processing circuitry is configured to execute the program instructions out of the memory to walk through the logical pool array of PD objects in time order using at least the first transaction ID and the second transaction ID, and to replay each bonded PD object and/or standalone PD object determined to contain valid MD.

16. The system of claim 9 wherein the bonded PD object has a fixed-size block allocation, wherein the log structured data log has a media granularity greater than the fixed-size block allocation of the bonded PD object, and wherein the processing circuitry is configured to execute the program instructions out of the memory to pack the bonded PD object having the fixed-size block allocation into a physical block having a size that corresponds to the media granularity of the log structured data log.

17. A computer program product including a set of non-transitory, computer-readable media having instructions that, when executed by processing circuitry, cause the processing circuitry to perform a method comprising:
    receiving a write request from a storage client;
    in response to the write request from the storage client, performing a single object allocation in a log structured data log for a bonded page descriptor (PD)-page buffer (PB) pair, the bonded PD-PB pair including a bonded PD object tightly coupled to a PB;
    storing and persisting user data specified by the write request in the PB of the bonded PD-PB pair;
    storing and persisting metadata (MD) related to the user data in the bonded PD object of the bonded PD-PB pair;
    once the user data and related MD are stored and persisted in the bonded PD-PB pair, sending an acknowledgment message to the storage client;
    de-staging, flushing, or transferring, in the background, the user data and/or the related MD from the bonded PD-PB pair to a storage object,
    wherein the bonded PD object has a fixed-size block allocation, and
    wherein the log structured data log has a media granularity greater than the fixed-size block allocation of the bonded PD object; and
    packing the bonded PD object having the fixed-size block allocation into a physical block having a size that corresponds to the media granularity of the log structured data log.

18. The computer program product of claim 17 wherein the bonded PD object is one of a plurality of bonded PD objects in a logical pool array of bonded PD objects, wherein the PB is one of a plurality of PBs in a logical pool array of PBs, and wherein the performing of the single object allocation includes allocating the same identical array index for each of the bonded PD object and the PB of the bonded PD-PB pair.

\* \* \* \* \*